United States Patent
Lindelsee et al.

(10) Patent No.: US 10,789,808 B1
(45) Date of Patent: Sep. 29, 2020

(54) PROCESS FOR ALLOWING A CONSUMER TO PLAY AND REDEEM VIRTUAL INSTANT TICKETS USING A NFC CHIP OR TAG THAT STORES INVENTORY CONTROL NUMBERS, AND AN ANCILLARY DEVICE THAT FACILITATES COMMUNICATION BETWEEN THE NFC CHIP OR TAG AND A REMOTE GAMING SERVER WHICH PROVIDES GAME OUTCOMES TO THE ANCILLARY DEVICE FOR DISPLAY THEREON

(71) Applicant: Tapcentive, Inc., San Francisco, CA (US)

(72) Inventors: Mike Lindelsee, South Lake Tahoe, CA (US); David Wentker, San Francisco, CA (US); Kenneth E. Irwin, Jr., Dawsonville, GA (US)

(73) Assignee: Tapcentive, Inc., San Francisco, CA (US)

( * ) Notice: Subject to any disclaimer, the term of this patent is extended or adjusted under 35 U.S.C. 154(b) by 0 days.

(21) Appl. No.: 16/867,626

(22) Filed: May 6, 2020

Related U.S. Application Data

(60) Provisional application No. 62/915,045, filed on Oct. 15, 2019.

(51) Int. Cl.
| | |
|---|---|
| *G07F 17/32* | (2006.01) |
| *G06Q 20/04* | (2012.01) |
| *G06Q 20/34* | (2012.01) |
| *G06K 19/07* | (2006.01) |
| *G06K 19/04* | (2006.01) |
| *G06Q 50/34* | (2012.01) |

(52) U.S. Cl.
CPC ....... *G07F 17/3251* (2013.01); *G06K 19/041* (2013.01); *G06K 19/0723* (2013.01); *G06Q 20/0457* (2013.01); *G06Q 50/34* (2013.01)

(58) Field of Classification Search
None
See application file for complete search history.

(56) References Cited

U.S. PATENT DOCUMENTS

| | | | |
|---|---|---|---|
| 5,871,398 A | 2/1999 | Schneier et al. | |
| 9,064,381 B2 | 6/2015 | Stanek et al. | |
| 9,547,957 B2 | 1/2017 | Irwin, Jr. et al. | |
| 9,721,425 B2 | 8/2017 | Irwin, Jr. et al. | |
| 9,911,274 B2 | 3/2018 | Shenker et al. | |
| 10,360,577 B2 | 7/2019 | Shenker et al. | |
| 10,366,564 B1 | 7/2019 | Wentker et al. | |
| 10,529,187 B2 | 1/2020 | Irwin, Jr. et al. | |
| 10,593,153 B2 | 3/2020 | Shenker et al. | |
| 2015/0050976 A1* | 2/2015 | Morin | G07F 17/3267 463/17 |
| 2016/0212103 A1* | 7/2016 | Rhoads | G06F 21/604 |
| 2018/0205714 A1* | 7/2018 | Rosati | H04L 9/06 |
| 2018/0345153 A1* | 12/2018 | Irwin, Jr. | G06Q 20/35765 |

* cited by examiner

*Primary Examiner* — Ronald Laneau
(74) *Attorney, Agent, or Firm* — Panitch Schwarze Belisario & Nadel LLP

(57) ABSTRACT

Near Field Communication (NFC) chips or tags are securely activated where at least one validation or redemption number is assigned to the chip or tag at the time of activation. Subsequent to activation, the NFC chip or tag enables secure data access via an Ancillary Device. Validation or redemption of the NFC chip or tag is also provided for.

18 Claims, 11 Drawing Sheets

Validation Database 300 (Validation Code Database)

| Validation Code | Game Outcome (Ticket Value) | Assigned (linked) to an inventory control number? (YES or NO) | Redeemed (YES, NO, or n/a for Non-Winning tickets) |
|---|---|---|---|
| ⋮ | ⋮ | | |
| 888781032158 | No win | NO | n/a |
| 683473358290 | $2.00 | NO | NO |
| 789369458712 | No win | NO | n/a |
| 567559267002 | No win | NO | n/a |
| 123456789012 | $2,000 | NO | NO |
| 285586860013 | No win | NO | n/a |
| 783781458158 | No win | NO | n/a |
| 043473358291 | No win | NO | n/a |
| 669368858714 | No win | NO | n/a |
| 467959267117 | No win | NO | n/a |
| ⋮ | | | |

FIG. 3A

Validation Database 300 (Validation Code Database)

| Validation Code | Game Outcome (Ticket Value) | Assigned (linked) to an inventory control number? (YES or NO) | Redeemed (YES, NO, or n/a for Non-Winning tickets) |
|---|---|---|---|
| ⋮ | ⋮ | | |
| 888781032158 | No win | YES | n/a |
| 683473358290 | $2.00 | YES | YES |
| 789369458712 | No win | YES | n/a |
| 567559267002 | No win | YES | n/a |
| 123456789012 | $2,000 | YES | NO |
| 285586860013 | No win | NO | n/a |
| 783781458158 | No win | NO | n/a |
| 043473358291 | No win | NO | n/a |
| 669368858714 | No win | NO | n/a |
| 467959267117 | No win | NO | n/a |
| ⋮ | | | |

FIG. 3B

Validation Database 300 (Validation Code Database)

| Validation Code | Game Outcome (Ticket Value) | Assigned (linked) to an inventory control number? (YES or NO) | Redeemed (YES, NO, or n/a for Non-Winning tickets) |
|---|---|---|---|
| ⋮ | ⋮ | | |
| 888781032158 | No win | YES | n/a |
| 683473358290 | $2.00 | YES | YES |
| 789369458712 | No win | YES | n/a |
| 567559267002 | No win | YES | n/a |
| 123456789012 | $2,000 | YES | YES |
| 285586860013 | No win | YES | n/a |
| 783781458158 | No win | YES | n/a |
| 043473358291 | No win | YES | n/a |
| 669368858714 | No win | YES | n/a |
| 467959267117 | No win | YES | n/a |
| ⋮ | | | |

FIG. 3C

Linked Activated Chips Database 400

| Chip or Tag Identifier (Manufacturer's #) | Assigned Chip or Tag Identifier (Commercial Entity) | Inventory Control Number | Validation Code (Validation Number) | Ticket Value |
|---|---|---|---|---|
| ⋮ | ⋮ | ⋮ | ⋮ | ⋮ |
| 1AT56QE65 | 12345678 | 089-46127-235 | | |
| 1AT56QE65 | 12345678 | 089-46127-236 | | |
| 1AT56QE65 | 12345678 | 089-46127-237 | | |
| 1AT56QE65 | 12345678 | 089-46127-238 | | |
| 1AT56QE65 | 12345678 | 089-46127-239 | | |
| 1AT56QE66 | 12345679 | 089-46127-240 | | |
| 1AT56QE66 | 12345679 | 089-46127-241 | | |
| 1AT56QE66 | 12345679 | 089-46127-242 | | |
| 1AT56QE66 | 12345679 | 089-46127-243 | | |
| 1AT56QE66 | 12345679 | 089-46127-244 | | |
| ⋮ | ⋮ | ⋮ | ⋮ | ⋮ |

FIG. 4A

Linked Activated Chips 400

| Chip or Tag Identifier (Manufacturer's #) | Assigned Chip or Tag Identifier (Commercial Entity) | Inventory Control Number | Validation Code (Validation Number) | Ticket Value |
|---|---|---|---|---|
| ⋮ | ⋮ | ⋮ | ⋮ | ⋮ |
| 1AT56QE65 | 12345678 | 089-46127-235 | 888781032158 | No win |
| 1AT56QE65 | 12345678 | 089-46127-236 | 683473358290 | $2.00 |
| 1AT56QE65 | 12345678 | 089-46127-237 | 789369458712 | No win |
| 1AT56QE65 | 12345678 | 089-46127-238 | 567559267002 | No win |
| 1AT56QE65 | 12345678 | 089-46127-239 | 123456789012 | $2,000 |
| 1AT56QE66 | 12345679 | 089-46127-240 | | |
| 1AT56QE66 | 12345679 | 089-46127-241 | | |
| 1AT56QE66 | 12345679 | 089-46127-242 | | |
| 1AT56QE66 | 12345679 | 089-46127-243 | | |
| 1AT56QE66 | 12345679 | 089-46127-244 | | |
| ⋮ | ⋮ | ⋮ | ⋮ | ⋮ |

FIG. 4B

Linked Activated Chips 400

| Chip or Tag Identifier (Manufacturer's #) | Assigned Chip or Tag Identifier (Commercial Entity) | Inventory Control Number | Validation Code (Validation Number) | Ticket Value |
|---|---|---|---|---|
| ⋮ | ⋮ | ⋮ | ⋮ | ⋮ |
| 1AT56QE65 | 12345678 | 089-46127-235 | 888781032158 | No win |
| 1AT56QE65 | 12345678 | 089-46127-236 | 683473358290 | $2.00 |
| 1AT56QE65 | 12345678 | 089-46127-237 | 789369458712 | No win |
| 1AT56QE65 | 12345678 | 089-46127-238 | 567559267002 | No win |
| 1AT56QE65 | 12345678 | 089-46127-239 | 123456789012 | $2,000 |
| 1AT56QE66 | 12345679 | 089-46127-240 | 285586860013 | No win |
| 1AT56QE66 | 12345679 | 089-46127-241 | 783781458158 | No win |
| 1AT56QE66 | 12345679 | 089-46127-242 | 043473358291 | No win |
| 1AT56QE66 | 12345679 | 089-46127-243 | 669368858714 | No win |
| 1AT56QE66 | 12345679 | 089-46127-244 | 467959267117 | No win |
| ⋮ | ⋮ | ⋮ | ⋮ | ⋮ |

FIG. 4C

Chip or Tag Identifier Database 500

| activation barcode (inventory control barcode) 150 | Chip or Tag Identifier (Manufacturer's #) | Assigned Chip or Tag Identifier (Commercial Entity) |
|---|---|---|
| AA00123456789XX | 1AT56QE65 | 089-46127-235 |
| AA00123456790XX | 1AT56QE66 | 089-46127-235 |
| ⋮ | ⋮ | ⋮ |

FIG. 5

PROCESS FOR ALLOWING A CONSUMER TO PLAY AND REDEEM VIRTUAL INSTANT TICKETS USING A NFC CHIP OR TAG THAT STORES INVENTORY CONTROL NUMBERS, AND AN ANCILLARY DEVICE THAT FACILITATES COMMUNICATION BETWEEN THE NFC CHIP OR TAG AND A REMOTE GAMING SERVER WHICH PROVIDES GAME OUTCOMES TO THE ANCILLARY DEVICE FOR DISPLAY THEREON

CROSS-REFERENCE TO RELATED APPLICATIONS

This application claims priority to U.S. Provisional Patent Application No. 62/915,045 filed Oct. 15, 2019, which is incorporated by reference herein.

FIELD OF THE INVENTION

The present invention is the innovation of control mechanisms for enhancing the utility of authenticating articles (e.g., lottery digital games, coupons, prescriptions) via Near Field Communication (NFC) read-only protocols after an activation event (e.g., sale, redemption, transaction) thereby enabling hereto unknown functionality and security. In a specific embodiment, the proposed methodology enables enhanced digital gaming experiences in an expanded retail environment also in compliance with Federal law concerning age and legal jurisdiction authentication.

BACKGROUND OF THE INVENTION

Lottery games have become a time-honored method of raising revenue for state and federal governments the world over. Traditional scratch-off and draw games have evolved over decades, supplying increasing revenue year after year. However, after decades of growth, the sales curves associated with traditional games seem to be flattening out with the existing retailer base appearing to plateau. Consequently, both lotteries and their service providers are presently searching for new sales venues.

One of the most promising genre of new lottery retailers is big box (e.g., Walmart, Target, etc.) and drug store retailers (e.g., Rite Aid, CVS, etc.), however attempts by lotteries and their service providers to recruit these new retailers have not succeeded. The main reasons for the lack of success is that lottery scratch-off games are too labor intensive and require secure locations for display and storage such that the consumer cannot access the tickets until purchased. Additionally, this requirement for secure placement may require big box and drug stores to have a separate lottery sales and redemption location, possibly requiring extra staff.

Aside from acquiring new big box retailers, there has been much speculation about enabling various lottery products to become digital gaming embodiments available to the consumer possibly over the Internet. The benefits are obvious: greater accessibility and a richer gaming environment for the player would most likely result in enhanced sales. However, there are various United States (US) federal laws that bring into question the legality of such an enterprise. These laws typically require proof that the digital gaming experience take place within the jurisdiction of the lottery authority (e.g., a given state's boundaries) and require that the consumer of the lottery digital gaming product is of legal age. These are particularly challenging obstacles given that a violation of either requirement (i.e., location or age authentication) could result in felony charges against the institution running the digital gaming lottery operation.

Additionally, any attempt at implementing a new legal (i.e., lottery based) digital gaming product typically involves developing new costly infrastructures for sales and redemption as well as the gaming environment itself. It is therefore highly desirable to develop a system for authenticating age and location for digital gaming as well as ensuring that the system could be readily integrated into an existing lottery's infrastructure.

Various attempts have been made to resolve these issues and thereby increase the marketability of lottery products, most notably United States patents: U.S. Pat. No. 5,871,398 (Schneier et al.); U.S. Pat. No. 9,064,381 (Stanek et al.); U.S. Pat. No. 9,721,425 (Irwin et al.); and U.S. Pat. No. 9,547,957 (Irwin et al.). Schneier teaches allowing consumers to " . . . purchase instant-type lottery game outcomes from a randomized prize data stream in a central computer, and view the outcomes on remotely disposed gaming computers which do not require an on-line connection during play" (Abstract). Thus, Schneier effectively overcomes the problems of digital gaming age and jurisdiction authentication by employing lottery retailer establishments for purchase and redemption, thereby allowing age and jurisdiction authentication to be conducted in the same manner as existing instant (scratch-off) ticket products. However, the systems and methods taught in Schneier require complex cryptographic protocols and ancillary equipment that would require lotteries to invest considerable funds to implement. Also, Schneier is completely silent on selling lottery products in new venues (e.g., big box, drug stores) as well as in non-secure locations.

Stanek teaches adding a "digital gaming enabling portion" to a conventional paper instant (scratch-off) lottery ticket (e.g., FIG. 5, callout 123'), thereby also resolving the age and jurisdiction authentication problems associated with Internet digital gaming by selling and redeeming lottery digital games at authorized lottery retailers. However, like Schneier, Stanek is completely silent on selling lottery products in new venues (e.g., big box, drug stores) as well as in non-secure locations.

Like Schneier and Stanek, the Irwin '425 patent resolves the problems of digital gaming age and jurisdiction authentication by selling and redeeming lottery digital games at authorized lottery retailers. Though, the Irwin '425 patent teaches piggybacking " . . . on a merchant's existing debit or credit card interchange system" (Abstract) with the added benefits of readily enabling lottery digital game transactions with an expanded retailer base including big box and drug stores. Additionally, by embodying lottery draw games as paper quick pick cards (see FIG. 12, callout 200) that are activated at the time of sale, the Irwin '425 patent also overcomes the problem of some lottery products requiring secure placement. Yet, the Irwin '425 patent disclosure inherently creates some security concerns. While placing lottery draw games as paper quick pick cards in easy reach of the public poses virtually no new security concerns, the same cannot be said for instant scratch-off tickets. If the public can access instant scratch-off tickets before they are purchased, it is conceivable that an illicit consumer or store insider would simply scratch-off the instant tickets, and then only purchase the winning tickets. This security concern can be somewhat mitigated by simply only revealing a ticket's winning status during the digital game play with no indication of winning or losing status printed on the ticket.

However, unless digital gaming winning and losing reveals are carefully secured, and more to the point only disclosed after the individual ticket is purchased, it may still be possible to pick out winning tickets before they are sold or possibly photocopy the barcode or human readable activation codes and redeem winning copied tickets before the consumer returns with the actual winning ticket. Finally, the Irwin '957 patent attempts to somewhat mitigate these security problems by only awarding game play credits on digital game instant tickets (e.g., FIG. 3, callout 251) and assigning a predetermined prize outcome at the time of game play. Again, unless the individual physical ticket sale is coordinated closely with enabling digital game play, the pick out and/or photocopy security problem remains.

Recently, other attempts have been made to resolve these issues by creating new types of lottery type products based on "secure gambling microprocessors" connecting via Near Field Communications (NFC) to off-the-shelf consumer devices (e.g., smart phones, tablet computers), particularly U.S. Pat. No. 9,911,274 (Shenker et al.), U.S. Pat. No. 10,360,577 (Shenker et al.), and U.S. Pat. No. 10,366,564 (Wentker et al.). The Shenker '274 patent teaches utilizing a "a plurality of mobile computing devices and a plurality of secure gambling microprocessors . . . to provide a plurality of secure stand-alone gambling platforms" (Abstract). Each of these secure gambling microprocessors having an unique identifier and memory with stored monetary amounts and predetermined gaming outcomes. Thus, once activated by a central site gambling management system, the secure gambling microprocessors coupled with a consumer mobile computing device provides effectively an autonomous gaming platform. A similar system is disclosed in the Shenker '577 patent albeit primarily focused on coupon gaming utilizing the outcome of a secure Random Number Generator (RNG).

Both of the Shenker patents overcome the problems of digital gaming age and jurisdiction authentication by employing retailer establishments for purchase and redemption, thereby allowing age and jurisdiction authentication to be conducted in the same manner as existing instant (scratch-off) ticket products. Additionally, the ability to activate the secure gambling microprocessor after a sale with monetary ("purse") values maintained in local memory could possibly enable selling lottery products in new venues (e.g., big box, drug stores) as well as in non-secure locations. However, the systems and methods taught in both Shenker patents require complex systems and protocols as well as ancillary equipment (e.g., NFC writer and reader devices) that would require lotteries to invest considerable funds to implement and consequently have met some resistance in the marketplace.

The Wentker patent discloses a similar type of secure "portable microprocessor . . . that accepts and stores wagers selected by a consumer, generates wagers on behalf of the consumer, and maintains secure virtual tickets for the consumer that can be authenticated and accepted by a gaming authority" (Abstract). Also similar to the Shenker patents, the disclosed secure portable microprocessor of Wentker communicates with a consumer's off-the-shelf mobile device that, in turn, communicates with a central site game server. Therefore, while Wentker discloses innovations of convenience and portability for lottery draw games, it is largely silent on lottery instant ticket games and more to the point digital embodiments of lottery games. Consequently, Wentker does not directly address the security concerns of digital lottery games per se and does not specifically accommodate an expanded retailer base of big box and drug stores.

Partially because of these legal hurdles, auditing requirements, and security concerns digital lottery games to date have been slow to gain widespread acceptance. Additionally, accommodating an expanded retailer base of big box and drug stores with multilane checkout and lottery products within easy reach of the consumer continues to be a vexing problem. Thus, it is highly desirable to develop a digital gaming platform that not only conforms to legal requirements, but also enables a wider retailer base resulting in a more sustainable digital gaming experience.

BRIEF SUMMARY OF THE INVENTION

Objects and advantages of the invention will be set forth in part in the following description, or may be obvious from the description, or may be learned through practice of the invention.

In a general embodiment, a method and system are provided for linking an activation event with a Near Field Communication (NFC) chip or tag such that subsequent transactions are both validated and authenticated via the NFC chip or tag generated passcode(s) or key(s). A NFC system is disclosed that allows for individual chip or tag activation with a Point Of Sale (POS) barcode reader or other device communicating with a central site that assigns unique validation number(s) or code(s) to the chip or tag at the time of activation. Subsequent secure data access is then enabled by a consumer's device (e.g., smart phone) communicating via NFC to the chip or tag to garner passcode(s) or key(s), passing the garnered passcode(s) or key(s) to a central site system, ultimately culminating in a validation or redemption.

The activation is primarily enabled by the assignment of unique validation number(s) or code(s) to the chip or tag at the time of activation. In a specific embodiment, multiple inventory control numbers are preprogrammed into the chip or tag prior to activation. In this specific embodiment, multiple validation numbers or codes are assigned to the chip or tag—i.e., one validation number or code for each unique inventory control number.

After activation, a consumer's device querying the NFC chip or tag utilizes the retrieved digital passcode(s) or key(s) to make secure data requests to a central site server that subsequently returns secure data that is a function of the unique validation number(s) or code(s) assigned to the chip or tag at activation. Additionally, the unique validation number(s) or code(s) that are assigned to the chip or tag at activation, also enable validation or redemption of the chip or tag at a POS device at a later time.

In a preferred embodiment, the retrieved digital passcode(s) or key(s) are dynamic and/or include a cryptographic digital signature signed by the chip or tag. This preferred embodiment has the advantage of multiple, non-repeating, secure data requests with the possible disadvantage of a more complex and expensive cheap or tag.

In a specific alternative embodiment, the NFC chips or tags can be read-only, implemented in a manner that ensures compatibility with existing regulations. This disclosed read-only NFC system allows for individual chip or tag data access with an Ancillary Device utilizing read-only functionality of NFC and the NFC Data Exchange Format (NDEF). This modified NDEF system having the advantage of allowing for individual chip or tag restricted data access while being compatible with relatively inexpensive, static data, NDEF compliant chips as well as more expensive, higher memory capacity, as well as dynamic chips.

In another alternative embodiment, the NFC chips or tags themselves are activated or unlocked by a separate mechanism (e.g., retailer POS NFC device at the time of sale) where after activation, the activated chips or tags still interface to the consumer's device exclusively via NFC. This embodiment has the advantage of potentially the highest levels of functionality and marketability with the disadvantages of the highest cost and greatest complexity.

Described are a number of mechanisms and methodologies that provide practical details for reliably producing NFC systems for lottery instant tickets that are activated and enable secure data access than was previously deemed possible with the NFC chips or tags and the NDEF protocol.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 3A thru 3C are validation databases compatible with the embodiments of FIGS. 1A and 1B;

FIGS. 4A thru 4C are activated chip databases compatible with the embodiments of FIGS. 1A and 1B; and FIG. 5 is a Chip or Tag Identifier Database for use in one preferred embodiment of the present invention.

DETAILED DESCRIPTION OF PREFERRED EMBODIMENTS

Figure 1A:
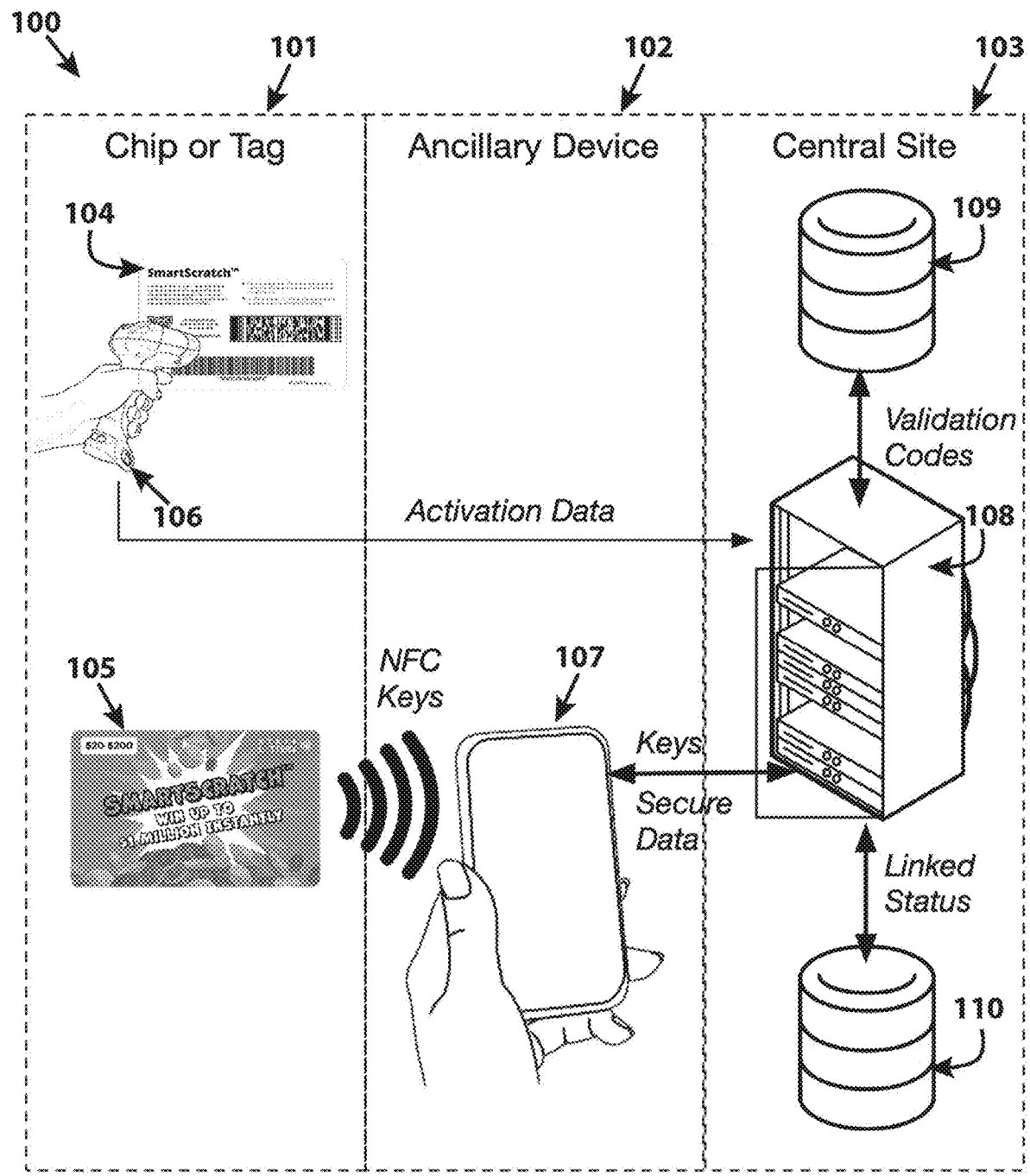
FIG. 1A is a representative example high level architecture swim lane diagram of the key components associated with assigning a validation or redemption number to a static or dynamic NFC chip or tag with a consumer's device subsequently gaining secure data access by interacting with the NFC chip or tag via NDEF protocol.

Certain terminology is used herein for convenience only and is not to be taken as a limitation on the present invention. The words "a" and "an", as used in the claims and in the corresponding portions of the specification, mean "at least one." In the context of this invention, discussions utilizing terms such as "providing", "receiving", "responding", "verifying", "challenging", "generating", "transmitting", or the like, often refer to the actions and processes of an electronic computing device and/or system, such as a desktop computer, notebook computer, tablet, mobile phone, and electronic personal display, among others. Additionally, the term "ancillary device" as used in the specification and claims refers to a NFC compatible device that can read (and optionally write) data from the NFC chip or tag and relay the received data to a central site. As a practical matter, the "ancillary device" could be a NFC enabled phone (e.g., iPhone or Android) controlled by the consumer or a point-of-sale (POS) card reader installed at retailer to accept NFC-enabled payment cards.

The electronic computing device and/or system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems. The abbreviations "NFC" and "NDEF" denote "Near Field Communication" and "NFC Data Exchange Format" respectively. Also, in the context of this invention, the terms "chip" or "tag" are used interchangeably, always referring to an Integrated Circuit or "IC" that supports NFC. A "memory chip" as used in the claims and in the corresponding portions of the specification, signifies a chip or IC with read only memory (e.g., Read-Only Memory or "ROM", Electrically Erasable Programmable Read-Only Memory or "EEPROM", Flash), but no dynamic processing capabilities. A "microprocessor chip" denotes a chip or IC with processing, Random Access Memory (RAM) as well as ROM. In general, NFC chips (e.g., SmartMX designed by NXP, NTAG DNA also designed by NXP) are a dedicated computer on a chip or microprocessor, embedded in a packaging with multiple physical security measures which give it a degree of tamper resistance. Although in some (more limited) applications, NFC dynamic microprocessor chips may be replaced with a simpler and cheaper NFC memory chip that essentially provides read-only static data via NDEF. Regardless of the chip type, the chip communicates to the ancillary device via a contactless NFC interface according to ISO/IEC 14443. Finally, the term "static" refers to a NFC chip where the information or data transmitted never varies throughout the life of the chip. In contrast a "dynamic" chip refers to a NFC compatible chip where the information or data transmitted can optionally vary from one read to another.

Before describing the present invention, it may be useful to first provide a brief description of the current state of the art of lottery instant ticket production and validation. The concept is to ensure that a common lexicon is established of existing systems prior to describing the present invention.

In the case of typical paper instant tickets, a computer system first allocates a finite series of win or lose outcomes to a sequential series of virtual tickets such that at least the total number of tickets to be printed are all assigned a virtual ticket with a win or lose outcome. So far, the process has been completely deterministic with the order of the virtual tickets typically highly predictable (e.g., highest tier winning ticket is pack 1 ticket 1); consequently, while each outcome is assigned to an associated virtual instant ticket, as a practical matter this deterministic arrangement of tickets cannot be printed as is and put on sale to the public. To achieve a pseudorandom (i.e., less deterministic) distribution the virtual tickets are then shuffled with the shuffled outcome assigned to each individual instant lottery ticket to be printed.

The consumer purchases a paper ticket and cannot change the ticket outcome. He or she merely scratches off certain areas of the ticket in accordance with the rules of the game to reveal the previously printed outcome. Each ticket contains variable indicia which provide the consumer with a means to determine win or lose results or prize status, and the type of prize (e.g., cash or a free ticket). The aggregate of all winning outcomes in any pseudorandomized prize distribution is a predetermined percentage payout of the total revenues that would be generated by the sale of all of the tickets incorporating that particular pseudorandomized prize distribution.

Hence, the instant ticket outcomes are generated by the computer system that controls the printing of the paper tickets. These outcome pseudorandomized prize distributions contain all outcomes for any given press run of tickets. The outcomes are created using essentially similar methodologies throughout the industry. For example, a run of 24 million tickets that has 120 top prize payouts of $10,000 and a payout percentage of 65%, may be broken up into 100 pools of 240,000 tickets each. The $10,000 winners will be distributed as evenly as possible among the 100 pools, so there will be at least one top prize in each pool, with 20 pools having two top prizes. The 80 pools without the two top prizes will be compensated by offering more low and mid-tier prizes, so that the payout percentage is exactly 65% for each 240,000 ticket pool. Each of these 240,000 ticket pools is broken up into packs of tickets, typically 200 to 400 tickets per pack. Tickets are delivered to retailers in pack units, where each ticket has two identifying numbers, a pack/ticket number also referred to as an "inventory control number" and a separate validation number. The pack/ticket (inventory control) number is usually printed on the back of the ticket in both human readable and barcoded formats. An exemplary pack ticket (inventory control) number is "089-46127-234." The "089" identifies the game for the given lottery, let's call it "Lottery $\chi$ Galt's Gold." The "46127" is the pack number, which in this case means that this ticket is from pack number 46127. The "234" identifies this ticket as the 234th ticket from this pack. The validation number is printed under the Scratch-Off-Surface (SOC) on the front of the ticket, again typically both in human readable and barcoded formats. This validation number is the key to determining on the system whether or not the ticket is a winner. When a winning ticket is presented for prize redemption, the retailer types or scans this number into a lottery terminal, from which access to a central database of instant tickets provided by the ticket printer is searched for that print run of tickets. This database resides in a separate computer at the main central site computer center of the lottery service provider—e.g., International Game Technology (IGT), Scientific Games, Intralot.

To prevent fraud, the validation number cannot be seen without scratching off the SOC covering material. If the validation number were visible without requiring that the SOC be removed first, retailers could check whether or not each ticket was a winner, and then keep winning tickets for themselves, selling only the losing tickets to consumers. This validation number singularly identifies this ticket from the millions of tickets that are printed for that game. It is important to note that this number is encoded and not in sequential order. If the latter was the case, retailers could buy one ticket for themselves and check its validation number. They could then enter the next ten validation numbers into the lottery system to determine whether any were winners. Again, consumers might be sold the losing tickets while the retailer kept the winners. Encryption and other cryptographic protocols prevent this, because knowing one validation number provides the retailer with no information about the next number.

Some lotteries place restrictions on the distribution of outcomes, including limits on the number of high tier winners per pack, how many consecutive non-winning tickets $\chi$ % of the time, and the maximum number of non-winning tickets per print run. In arranging the game press run, the lottery authority decides how many tickets are to be sold, the prize fund or payback percentage of the game as a whole, and what prizes will be awarded and the frequency of winning tickets among the total number of tickets. For example, if the lottery wanted to sell a total of 20 tickets and have a payout percentage for the game of 50% with each ticket selling for $10 the prize distribution outcome might consist of one $5 winner, one $2 winner, and three $1 winners and may be represented as: "5, 2, 1, 1, 1, 0, 0, 0, 0, 0, 0, 0, 0, 0, 0, 0, 0, 0, 0, 0." Note that, as previously described, the finite series of win or lose outcomes is a sequential series of virtual tickets that is completely deterministic. There is no randomness at all. Of course, the lottery does not want to have the first five tickets sold to be winners, so the virtual tickets are shuffled to achieve a pseudo-randomized order for printing the tickets. In this example, the pseudorandomized resulting printing sequence might look like the following: "0, 0, 0, 0, 0, 1, 0, 2, 0, 0, 5, 0, 0, 0, 0, 1, 0, 0, 0, 1." As tickets are requested by consumers, they are removed from the sequence of outcomes. From the above set of outcomes, a consumer requesting four tickets might buy four losing tickets—0, 0, 0, 0. If the next consumer requested three tickets, he or she may get 0,1,0. The next three tickets sold might be 2,0,0. This process continues until the entire sequence of outcomes (twenty in this example) is exhausted. Of course, the printing computer can also pull outcome requests from the game sequence at random, so that a request for three outcomes could get the outcomes in location 5, 8, and 11 (which might correspond to 0,2,5). These outcomes would then be eliminated from the game sequence so that the next player cannot get the same sequence.

To redeem a winning paper instant lottery ticket, the player presents the ticket to a redeeming agent, either at a lottery retailer or lottery office, or mails the ticket in for redemption. To effectuate the redemption process, typically the redeeming agent scans the validation barcode on the ticket, that was previously hidden by the SOC, through a barcode scanner associated with the lottery terminal. This validation number is transmitted to the central cite computer for validation. When the central site computer receives a validation request, it activates a validation program which queries a ticket value database using the validation number to confirm that the ticket came from an activated pack and the ticket is indeed a winner that has not previously been paid. If the ticket value database confirms a payout, the validation program authorizes the lottery retailer to pay the consumer cash or provide another prize (e.g., a free ticket).

Having described the typical, prior art, instant ticket lottery system reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention. Of course, as is apparent to one skilled in the art, while the present invention is primarily disclosed as a lottery product other applications (e.g., cruise ship gaming, tribal casino digital pull-tabs) of the disclosed invention are possible without departing from the scope and spirit of the present invention FIGS. 1A and 1B, taken together, illustrate one general embodiment describing a system for linking an activation event with a Near Field Communication (NFC) chip or tag such that subsequent transactions are both validated and authenticated via the NFC chip or tag generated passcode(s) or key(s). The NFC system architecture diagram is illustrated in FIG. 1A with the associated flowchart of the same embodiment illustrated in FIG. 1B. As illustrated in the swim lane illustration 100 and 125 of FIGS. 1A and 1B, this one embodiment of the invention is conceptually divided into three groups (i.e., "Chip or Tag" 101 and 126, "Ancillary Device" 102 and 127, and "Central Site" 103 and 128) by the three "swim lane" columns as shown in both figures. If a particular flowchart function appears completely within a swim lane, its functionality is limited to the data category of the associated swim lane—e.g., the Validation Codes database 109 and 131 resides exclusively in the Central Site 103 and 128.

Figure 1B:
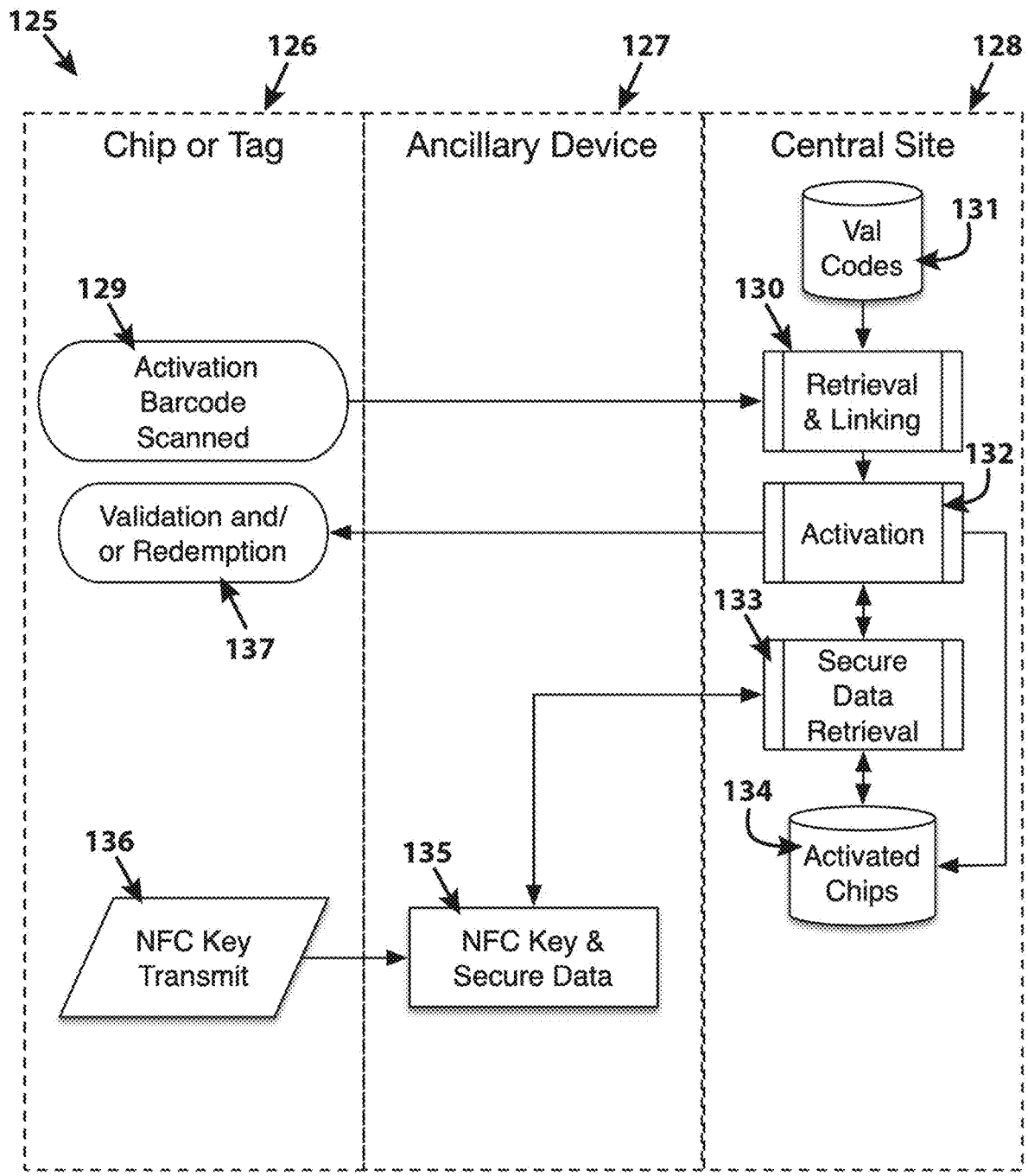
FIG. 1B is a swim lane block diagram providing a schematic graphical overview of a general embodiment system for assigning a validation or redemption number to a static or dynamic NFC chip or tag thereby enabling subsequent secure data access via a consumer's device in accordance with the embodiment of FIG. 1A.
Figure 1C:
FIG. 1C provides magnified views of the representative example card 104 and 105 of FIG. 1A.

The NFC system architecture diagram 100 of FIG. 1A starts with the retailer scanning 106 an activation barcode off of the tag 104 with the embedded NFC chip (a magnified view of the tag 104' is provided in FIG. 1C with associated activation barcode (inventory control barcode) 150 also magnified) to activate the tag and chip, presumably when the tag is purchased by a consumer. The resulting barcode digital data is then transmitted to the Central Site 103 server 108 (FIG. 1A) where at least one validation code is extracted from the validation database 109 and linked to the chip or tag 101 where the linked status is then stored, typically, in a separate Activated Chips linked database 110. After the linking of the at least one validation code to the Chip or Tag 101 is completed, the Chip or Tag 101 is then registered as "activated" on the Central Site 103, thereby enabling future transactions.

Within a designated portion of non-volatile memory (e.g., FIG. 2 Erasable Programable Read Only Memory or "EEPROM" 208 and/or Read Only Memory or "ROM" 209) of each Chip or Tag 101 (FIG. 1A) is at least one (system-wide) unique inventory control number representing at least one virtual ticket game play that was previously assigned to the Chip or Tag 101 at the time of manufacture. Typically, multiple inventory control numbers will be stored in a single Chip or Tag 101—e.g., FIG. 4A chip database 400 lists five unique inventory control numbers assigned to chip or tag "1AT56QE65". Typically, inventory control numbers will be structured starting with a three or four decimal digit game number (e.g., "089" as listed in chip database 400), followed by a fixed number of decimal digits virtual pack number (e.g., "46127" as listed in chip database 400), terminating with a two or three decimal digit virtual ticket or play number (e.g., "235" thru "239" as listed in chip database 400) such that Chip or Tag 101 (FIG. 1A) inventory control numbers are formatted in the same manner as traditional lottery paper ticket inventory control numbers. However, this legacy inventory control format is not essential, the significant concept is that each inventory control number is unique to the entire system.

Preferably, when the Chip or Tag 101 is activated, the Central Site 103 links the at least one inventory control number assigned to the Chip or Tag 101 to the at least one validation code in its Activated Chips linked database 110, which would include an activation barcode data to inventory control number(s) cross reference table. Thus, a plurality of unique inventory control numbers assigned to each Chip or Tag 101 may be linked by scanning one activation barcode. The activation barcode data functioning as a system-wide unique identifier for the Chip or Tag 101. The exact configuration of the activation data may vary from application to application. For example, the application barcode data could be the Chip or Tag Identifier "Manufacturer's #" (See Chip Database 400 of FIG. 4A), the commercial entity Assigned Chip or Tag Identifier, or the first in a series of Inventory Control Numbers. The significant concept is that the application barcode data is unique from a system-wide perspective.

In a specific preferred embodiment, the number of available Chip or Tag 101 assigned inventory control numbers linked per activation barcode is variable typically determined by the price the consumer paid at activation—e.g., if each inventory control number represented $1 play value and the consumer paid $5 at activation, then five inventory control numbers would be linked. With this specific preferred embodiment, available inventory control numbers would be linked in a sequential basis progressing from the lowest numbered inventory control number to the highest. A record of the linked (activated) inventory control numbers would be maintained in the Central Site 103 Activated Chips linked database 110 with subsequent activations of the same Chip or Tag 101 linking the next available set of inventory control numbers in the assigned series.

In a specific alternate embodiment, the plurality of all inventory control numbers assigned to a Chip or Tag 101 may be transmitted to the Central Site 103 when the retailer scans the activation barcode 106. With this specific embodiment, a higher data density two dimensional format (e.g., PDF-417, QR or "Quick Response" code) should be employed to accommodate the plurality of inventory control numbers assigned to the Chip or Tag 101.

In another alternative embodiment, the inventory control numbers assigned to a Chip or Tag 101 may be transmitted by alternative methods than a tag barcode using the retailer's Point-Of-Sale (POS). For example, the retailer's POS NFC device could be utilized to read or unlock information preprogrammed into the chip or tag that, in turn, is transmitted to the central site for activation. If multiple inventory control numbers were preprogrammed into the chip or tag prior to activation multiple validation codes are assigned to the chip or tag during activation—i.e., one validation code for each inventory control number. Regardless of the number of inventory control numbers preprogrammed into the chip or tag, in this specific embodiment, the activation barcode (inventory control barcode) 150 (FIG. 1C) data may be optionally transmitted to the central site in addition to the chip or tag data garnered by the retailer's POS NFC device.

Subsequent to activation, the consumer will first download an application or go to a specified Internet web site. The Chip or Tag 101 of FIG. 1A and the QR Code 151 of FIG. 1C both provide a simple means for the consumer to be automatically directed to the web site using the NFC tag reading capability or QR code reading capability respectively of their Ancillary Device. The next step is for the consumer to request an authentication cryptographic key via the NFC interface from the chip or tag 105 of FIG. 1A (magnified view 105' provided in FIG. 1C) by tapping the chip or tag 105 (FIG. 1A) to the back of their Ancillary Device 102 (e.g., iPhone 107) thereby triggering a NFC transfer of at least one security key or security token (herein referred to as "security data") to the Ancillary Device 102. The retrieved security data is then forwarded to the Central Site 103 server 108 thus authenticating the Ancillary Device 102 to the server 108 also enabling sensitive data (e.g., game play outcomes) to be securely relayed back to the Ancillary Device 102 as clear text or optionally as ciphertext therefore allowing any pending transaction (e.g., game play) to continue. In an additional preferred embodiment, a similar NFC transfer is conducted with the retailer's POS equipment during activation and redemption instead of or in addition to scanning a separate validation barcode 152 (FIG. 1C).

The associated functional flowchart 125 of FIG. 1B provides an exemplary detailed disclosure of the functional components of the same embodiment as 100 of FIG. 1A. The functional flowchart 125 of FIG. 1B starts with the (presumably retailer) scanning the activation barcode (inventory control barcode) 150 (step 129) off of the Chip or Tag 126 (magnified view of the activation barcode (inventory control barcode) 150 provided on tag magnification 104' of FIG. 1C) with the retrieved barcode data transmitted to the Central Site 128. Alternatively, or in addition to, the Chip's or Tag's 126 NFC interface could be employed to garner and transmit similar information. On receipt of the inventory data, the Central Site 128 retrieves 130 at least one validation code from the Central Site 128 Validation Code database 131, linking 130 the at least one validation code to the activated Chip or Tag 126. The exact methodology for extracting the at least one validation code from the validation database 131 may vary. In one embodiment, the at least one validation code is pulled in a sequential fashion from a virtual stack of already generated validation codes. This embodiment has the advantage of simplicity as well as ensuring that any specified distribution of winning plays or other events is ensured by the sequential nature of the validation code acquisition. In another embodiment, the at least one validation code is pulled in a random or pseudorandom fashion from a virtual stack of already generated validation codes. This embodiment having the advantage of enhanced security over the previous embodiment with the possible disadvantages of not maintaining a specified distribution of winning plays or other events or possibly requiring an additional algorithmic process to ensure a specified distribution of winning plays or other events.

Regardless of the embodiment employed to extract the at least one validation code from the validation code database 131, once the at least one validation code has been retrieved, the retrieved validation code(s) is then linked 130 to the specific Chip or Tag 126 for all future transactions, with the retrieved validation code(s) removed from the potential pool of available validation code activations for any other chips or tags. Once this linking process 130 is completed, the Chip or Tag 126 is then placed in an activated state 132 with the new status typically recorded along with typically the retrieved validation code(s) in a preferably separate Activated Chips linked database 134.

Following activation 132, the consumer may first download an application or go to a specified Internet web site using the Chip or Tag 101 of FIG. 1A or QR Code 151 of FIG. 1C and their Ancillary Device (consumer device). Once the appropriate app is downloaded or web site accessed, the consumer's device pushes the security data from the Chip or Tag 126 (FIG. 1B) to the central site 128 or alternatively, the consumer's device receives from the web site an authentication challenge requiring security data from the Chip or Tag 126 to be transmitted. Regardless of the protocol, the Central Site always ensures that Chip or Tag 126 security data is received prior to allowing access to sensitive data (e.g., game play outcomes). The consumer requests this security data from the chip or tag 136 by tapping the Chip or Tag 126 to the back of their Ancillary Device 127 thereby triggering a NFC transfer of at least one set of security data 135 to the Ancillary Device 127. The composition of the security data may vary, but typically and preferably takes the form of a cryptographic key. This NFC retrieved key may be static or dynamic with static keys never changing and dynamic keys changing from transaction to transaction. The static key embodiment having the advantage of cheaper chip hardware with the disadvantage of lower security; however, it should be noted that the difficulty of inserting a valid static key into a NFC transfer with a physical chip or tag presented for validation is beyond the capabilities of most errant perpetrators. Alternatively, portions of a static memory chip data may be encrypted with different encryption keys, thereby marginally increasing the security without compromising the chip cost.

Nevertheless, the dynamic key embodiment algorithm is obviously more secure with each NFC transfer emitting a different key, though with the disadvantage of greater complexity and associated costs than the static embodiments. The dynamic key embodiment algorithm may be the outcome of a Linear Congruential Generator (LCG) or Mersenne Twister that by its very nature will provide a random appearing output that is difficult to guess, that is nevertheless completely deterministic and predictable if its starting seeds are known. Alternatively, another dynamic key embodiment algorithm may be to digitally sign a challenge message received from the Ancillary Device 127 with the Chip's or Tag's 126 private key.

Regardless of the embodiment employed, the retrieved key(s) is/are next forwarded to the Central Site 128, where the secure data retrieval process 133 consults the activated chip database 134 to determine the authenticity of the received key(s) relative to the activated chip or tag, thereby authenticating the Ancillary Device 127 to the Central Site 128. Assuming the authentication process was successful, the Central Site's 128 secure data retrieval process 133 transmits the secure data 135 (e.g., game play outcomes, associated validation codes) back to the Ancillary Device 127 allowing the transaction (e.g., game play, redemption) to continue. In an additional preferred embodiment, a similar NFC transfer is conducted with the retailer's POS equipment during validation and redemption 137 (e.g., transmitting the played and winning validation codes) instead of or in addition to scanning a separate validation barcode 152 (FIG. 1C).

The Ancillary Device 127 (FIG. 1B) is then subsequently enabled to execute at least one game play. The outcome of the at least one game play determined by the received game play outcome that is communicated from the Chip or Tag 126 to the Ancillary Device 127 via NFC.

Figure 2:
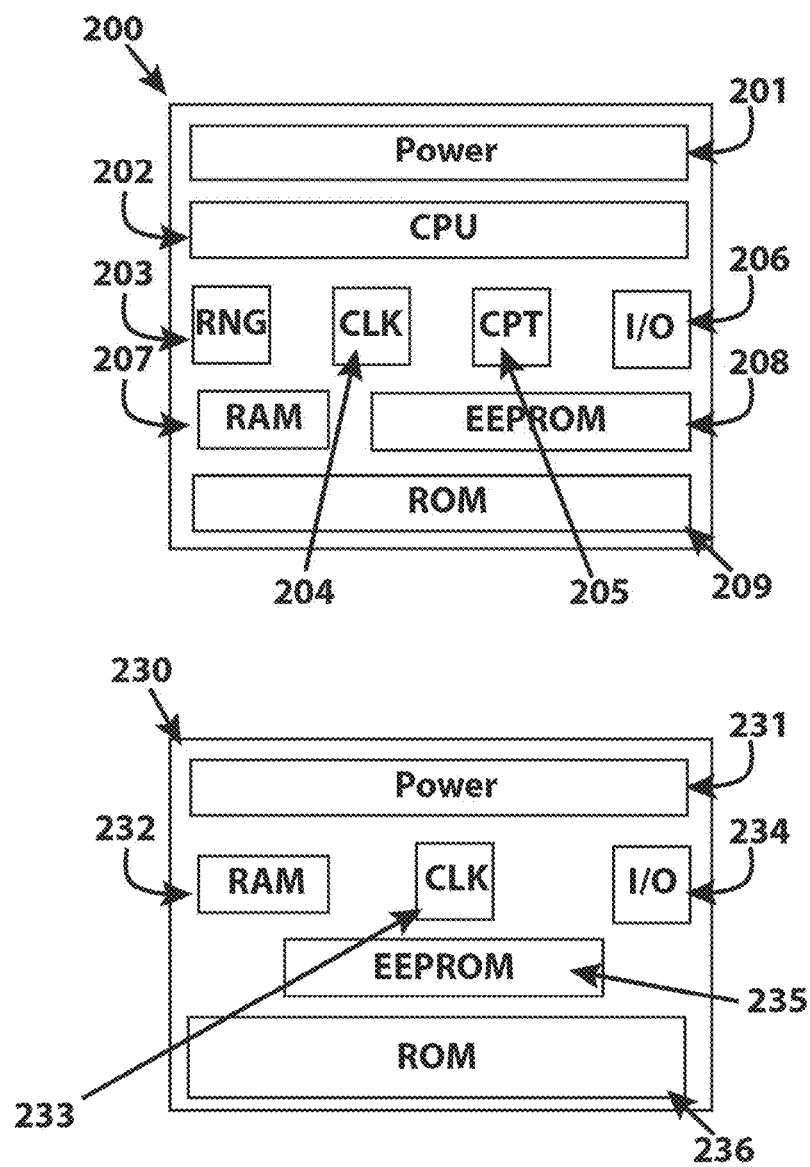
FIG. 2 is a representative schematic graphical detailed overview of the NFC chips or tags compatible with the embodiments of FIGS. 1A and 1B.

FIG. 2 illustrates both microprocessor 200 and static memory 230 NFC chips with the microprocessor 200 chip being capable of supporting dynamic authentication embodiments and the static memory 230 chip being preferably employed for static authentication embodiments that were both previously disclosed. For clarity, the appearance of both chip types on the same figure is intended to show how either NFC chip type is compatible with the system embodiment of 100 and 125 of FIGS. 1A and 1B respectively and not an indication that two chips are required for the system to function. In tag packaging embodiments (e.g., FIG. 1C callout 105'), either of these two chip types may be enclosed in the tag.

The dynamic embodiment's NFC microprocessor chip 200 includes: a Power 201 converter running off the NFC excitation signal, a Central Process Unit (CPU) 202, a Random Number Generator (RNG) 203, a connection for an external Clock (CLK) 204 provided by the NFC interface, a Cryptographic Processor (CPT) 205, an Input/Output (I/O) port 206, Random Access Memory (RAM) 207, Electronically Erasable Programable Read Only Memory (EEPROM)

208, and Read Only Memory (ROM) 209. Application unique software or data can be stored and run from ROM 209 or EEPROM 208 and could, optionally, rely on the support of the RNG 203 and CPT 205 for some operations. In general, NFC dynamic microprocessor chip 200 (e.g., SmartMX and NTAG 424 DNA both designed by NXP) are dedicated computers on a chip or microprocessor, embedded in a packaging with multiple physical security measures, which give them a degree of tamper resistance.

Alternatively, dynamic NFC microprocessor chip 200 may be replaced with simpler and cheaper NFC memory chip 230 (e.g., NTAG 213/215/216 also designed by NXP) providing write-once, read-only static data via NDEF for static authentication embodiments. The static NFC memory chip 230 includes: a Power 231 converter, a connection for an external CLK 233, an I/O port 234, RAM 232, ROM 236, and EEPROM 235. Of course, there are other possible configurations of NFC memory chips that are also compatible, illustration 230 being simply one possible example.

Regardless of the chip type, the NFC chip's I/O port (206 or 234) communications interface to the Ancillary Device is a contactless NFC interface in accordance with ISO/IEC 14443A. When the consumer's device 107 (FIG. 1A) initially connects with either chip type (200 or 230—FIG. 2) the excited chip transmits a portion of its NFC memory contents to the consumer's device 107 (FIG. 1A).

Examples of the preferred embodiments configurations of the validation code and activated chips databases described above are provided with respect to FIGS. 3A thru 3C and 4A thru 4C. FIGS. 3A thru 3C illustrate a validation database (validation code database) 300 similar to the validation code databases 109 and 131 of FIGS. 1A and 1B (respectively). FIGS. 4A thru 4C show a linked activated chip database 400 similar to the activated chip databases 110 and 134 of FIGS. 1A and 1B (respectively).

In these examples, a plurality of NFC chips or tags are programmed to include the ability to play a maximum of five virtual instant tickets, each having a $1.00 purchase price. As illustrated in FIGS. 4A thru 4C, two such NFC chips or tags are included with this example (i.e., chip or tag identifiers "1AT56QE65" and "1AT56QE66") with each NFC chip or tag preloaded with five unique inventory control numbers (as listed in the associated "Inventory Control Number" column). In one preferred embodiment, the NFC chip or tag has a manufacturer's assigned unique identifier number (e.g., "1AT56QE65"), and an additional unique identifier number assigned by the commercial entity that is providing the system for playing the instant tickets (e.g., "12345678"). It should be noted that this example is provided for simplicity and instructive purposes, in practice, each NFC chip or tag would typically be preloaded with a much larger number of unique inventory control numbers so that the consumer (purchaser) can make efficient use of a single NFC chip or tag thereby reducing the number of virtual instant tickets to chip cost ratio. As described in more detail below, in the exemplary models of FIGS. 3A thru 3C and 4A thru 4C the validation database 300 and the activated chip database 400 are shown at different paired time periods progressing from the "A" pair of figures to the "C" pair of figures—i.e., FIGS. 3A and 4A, FIGS. 3B and 4B, and FIGS. 3C and 4C with each pair of figures occurring at the same time, but a different time from the other figure pairs advancing in chronological order from FIGS. "A" to "B".

FIGS. 3A and 4A demonstrate the time period before activation of NFC chips or tags. As shown in FIG. 4A, the two separate chips or tags are listed with manufacturer identifier numbers "1AT56QE65" and "1AT56QE66." Since neither of these NFC chips or tags have been activated, no validation codes have been assigned or linked to the inventory control numbers that were preloaded into the respective NFC chips or tags. Accordingly, FIG. 3A indicates that none of the validation codes have been assigned to an inventory control number—i.e., all "NO" listings for the Assigned to an Inventory Control column.

FIGS. 3B and 4B illustrate the time period after activation of the NFC chip or tag having manufacturer identifier number "1AT56QE65", but before all five virtual instant ticket game plays have been redeemed. As shown in both FIG. 4B, at this moment in time the consumer has purchased all five game plays on the NFC chip or tag having identifier number "1AT56QE65", paying $5.00 at the retail outlet. Accordingly, the next five previously unassigned validation codes are retrieved from the validation FIG. 3B database 300 and assigned or linked to the five inventory control numbers of the NFC chip or tag having identifier number "1AT56QE65" as listed in the Validation Code column of FIG. 4B with the associated winning and losing values also linked. At this same period in time, FIG. 3B shows that the first five validation codes have been assigned to inventory control numbers with the $2.00 winner redeemed and the $2,000 winner not yet redeemed.

FIGS. 3C and 4C illustrate the time period after activation of the second NFC chip or tag having manufacturer identifier number "1AT56QE66" (NFC chip or tag having manufacturer identifier number "1AT56QE65" was previously activated). In this example, the same or a different consumer purchased all five game plays on the NFC chip or tag having identifier number "1AT56QE66", paying $5.00 at the retail outlet. Accordingly, the next five previously unassigned validation codes are retrieved from the validation database 300 of FIG. 3C and assigned or linked to the five inventory control numbers of the NFC chip or tag having identifier number "1AT56QE66" with the next five validation codes have been assigned to inventory control numbers.

To be clear, the consumer does not need to purchase all of the game plays on the NFC chip or tag and may purchase only a subset of the game plays. For example, the consumer may purchase two game plays on day one at a cost of $2.00, and then may purchase two more game plays on day two at an additional cost of $2.00, and then the consumer may throw out the NFC chip or tag without purchasing the fifth game play. In this example, the first two validation codes would be assigned or linked upon purchase to the first two inventory control numbers of the NFC chip or tag on day one, the second two validation codes would be assigned or linked upon purchase to the next two inventory control numbers of the NFC chip or tag on day two, and no validation code would ever get assigned or linked to the fifth inventory control number of the NFC chip or tag. Of course, as is apparent to one skilled in the art the assignment or linking of validation codes to inventory control numbers does not need to occur in a sequential fashion, validation code linking assignments may be selected via a random or pseudorandom process with the advantage of higher security and the disadvantage of increased complexity in ensuring restrictions on the distribution of outcomes, including limits on the number of high tier winners per pack.

Using the databases described above, in conjunction with a consumer-owned or controlled NFC enabled ancillary device (e.g., mobile phone), a plurality of consumers can play virtual instant tickets via a plurality of NFC chips or tags, each NFC chip or tag having a memory. The process typically operates as follows:

1. A validation database is maintained having unique validation codes, each validation code having an associated predefined game outcome, the predefined game outcome including a winning or losing outcome, and a value for any winning outcome.
2. A linked activated chips database including:
   (i) a plurality of unique inventory control numbers, each unique inventory control number being associated with a virtual instant ticket having a predefined purchase value;
   (ii) unique validation codes that become assigned (linked) to respective individual inventory control numbers upon purchase by the consumer of virtual instant tickets that are associated with respective unique inventory control numbers; and
   (iii) a plurality of unique NFC chip or tag identifiers, each unique NFC chip or tag identifier being associated with a subset of the unique inventory control numbers.
3. A plurality of virtual instant ticket plays are loaded to the memories of the plurality of NFC chips or tags by loading a different subset of the unique inventory control numbers to the memory of each of the plurality of NFC chips or tags. That is, each inventory control number represents one game play.
4. Electronically activating one or more of the virtual instant tickets on a NFC chip or tag by performing the following actions:
   (i) assign (link) unique validation codes from the validation database 300 to the inventory control numbers of the NFC chip or tag. The assigning (linking) occurs upon purchase by the consumer of the cost of ticket play for each of the virtual instant tickets loaded in the NFC chip or tag. In a preferred embodiment, the number of assigned validation codes depends upon the number of purchased instant ticket plays. This assigning may occur in sequential order of the inventory control numbers or alternatively in random or pseudorandom order. Regardless of the assigning methodology, any unassigned inventory control numbers may be subsequently assigned a validation code, beginning with the next available unassigned inventory control number.
   (ii) store the assigned unique validation codes in the linked activated chips database 400 spare writable memory with the respective inventory control numbers.
5. Upon completion of the activation process, a NFC chip or tag becomes ready for game play. A software program (application or "app") is downloaded or already available as in the case of a web browser for execution in a NFC-enabled ancillary device. The software program is configured to perform at least the following functions using the ancillary device:
   (i) read an identifier of an activated NFC chip or tag (e.g., manufacturer's number)—static memory chips only;
   (ii) electronically communicate the identifier to the remote server for static memory chips or retrieve Ticket Value 400 from memory for dynamic microprocessor chips;
   (iii) receive back from the remote server the game outcomes for the previously paid for game plays of the activated NFC chip or tag for static memory chips; and
   (iv) display the game outcomes on a display of the ancillary device—both static memory or dynamic microprocessor chips.

As shown in FIGS. 4A thru 4C, two different unique NFC chip or tag identifiers may be stored and used in the process—i.e., "Manufacturer's #" or "Commercial Entity." FIGS. 4A thru 4C list both sets of identifiers; however, the linked activated chips database 400 may include only one of the sets of identifiers, such as only the chip or tag identifier assigned by the commercial entity, and another database (not shown) may function as a translation database. In this manner, if the linked activated chips database 400 receives only the manufacturer's chip or tag identifier (or an indicator thereof) during a communication session associated with either purchasing or playing an instant ticket, the translation database is consulted to obtain the appropriate assigned chip or tag identifier in the remote database 400.

In operation, each of the plurality of consumers is physically provided with their own respective NFC chip or tag to perform the steps 4 and 5. Each of the respective NFC chips or tags operate independently from each other, and each of the respective NFC chips or tags are loaded with a different set of inventory control numbers.

These examples do not describe the use of the previously discussed authentication keys for communicating between the hardware elements. However, it should be understood that such authentication keys may be used to securely implement the embodiments in this example. For example, the identifier of an activated NFC chip or tag may be encrypted and decrypted at each end of the process and authenticated with respective keys.

One preferred embodiment of the above-described invention is provided in the following example which describes a process for allowing a plurality of consumers to play virtual instant tickets via a plurality of NFC chips or tags. Each NFC chip or tag has a unique NFC chip or tag identifier stored therein, and a memory that stores a plurality of unique inventory control numbers allocated to the NFC chip or tag. The plurality of unique inventory control numbers is a subset of a pool of unique inventory control numbers. That is, starting with a pool of unique inventory control numbers, subsets of unique inventory control numbers are created, and each subset is loaded into a respective NFC chip or tag. Thus, the same inventory control number does not appear in multiple NFC chips or tags. Each inventory control number represents one game play having a game outcome (game play result). Each instant ticket has a predefined monetary amount (cost) for the one game play. For example, if an instant ticket costs $1.00, then the monetary amount for one game play is $1.00. In one preferred embodiment, the virtual instant tickets are associated with a lottery game, and the inventory control numbers are from the lottery game.

A remote gaming server (equivalent to server 108 of Central Site 103 of FIG. 1A) maintains various databases for implementing the process. A first database (equivalent to database 400) includes at least the following items:

1. The plurality of unique NFC chip or tag identifiers for the respective plurality of NFC chips or tags.

2. The plurality of unique inventory control numbers allocated to each of the respective NFC chip or tags identifiers.

A second database (equivalent to database 300) includes at least the following items:

1. A plurality of unique validation codes.

2. A game outcome associated with each of the validation codes.

3. An indicator of whether each of the validation codes has been assigned to a respective inventory control number.

4. An indicator of whether a virtual ticket associated with a winning validation code has been redeemed.

The process involves three major sub-steps, namely, an activation step, an authentication step, and a game play step, as described below.

Activation

A NFC chip or tag is activated upon purchase by the consumer of a monetary amount of virtual instant tickets to be associated with the NFC chip or tag via an electronic purchasing platform. (The monetary amount (cost) of virtual instant tickets translates into a predefined number of game plays based on the monetary amount purchased, and the cost per game play.) In one preferred embodiment, the electronic purchasing platform is a retailer's POS equipment, as described above. In an alternative embodiment, the electronic purchasing platform may be a purchase app executing in a user's smartphone. Regardless of the form factor of the electronic purchasing platform, the electronic purchasing platform electronically communicates at least the following data to the remote gaming server:

1. The NFC chip or tag identifier or an equivalent number thereof.

2. The monetary amount of virtual instant tickets that was purchased.

In one embodiment, the NFC chip or tag identifier is directly sent to the remote gaming server. In another embodiment, a number that is equivalent to the NFC chip or tag identifier is sent, such as the activation barcode (inventory control barcode) 150 of the NFC chip or tag, which is described above and shown in FIG. 1C.

The remote gaming server uses the NFC chip or tag identifier or the equivalent number thereof to identify the NFC chip or tag identifier in the first database. If the NFC chip or tag identifier is directly sent, the identification simply involves a simple lookup in the first database (database 400). If the equivalent number is sent, an additional table must be consulted, such as Chip or Tag Identifier Database 500 shown in FIG. 5 to locate the corresponding NFC chip or tag identifier. The activation barcode (inventory control barcode) 150 (FIG. 1C) is best suited for interfacing with existing POS systems, since such systems are typically not equipped to read out NFC chip or tag identifiers, unless special NFC reader equipment is installed.

Once the NFC chip or tag is identified, the remote gaming server assigns currently unassigned validation codes to respective inventory control numbers of the identified NFC chip or tag. The number of assigned validation codes equals the number of purchased game plays as determined by the monetary amount of purchased instant tickets and the predefined monetary amount for one game play. For example, if the consumer purchased $20 of instant tickets, and each instant ticket (one game play) costs $1.00, then twenty (20) validation codes would be assigned. If the consumer purchased $20 of instant tickets, and each instant ticket (one game play) costs $5.00, then only four (4) validation codes would be assigned. Activation is completed once the validation code assignment is made.

An assigned validation code cannot be assigned to another inventory control number. To ensure that no reassignment occurs, the indicators in the second database for the respective assigned validation codes are changed from "ASSIGNED=NO" to "ASSIGNED=YES".

Authentication

Authentication is the process for confirming that the consumer is in possession of a legitimate NFC chip or tag having legitimate inventory control numbers loaded therein. Authentication occurs as part of the game play process, preferably in a seamless and hidden manner. That is, authenticating a NFC chip or tag allows the consumer to reveal game outcomes of purchased virtual tickets. The authentication steps are described separately to provide a complete understanding of preferred embodiments of the present invention.

The authentication process begins by electronically communicating from the NFC chip or tag to the remote gaming server via an ancillary device the following information:

1. The NFC chip or tag identifier of the NFC chip or tag.

2. The plurality of inventory control numbers allocated to the NFC chip or tag.

The electronic communication between the NFC chip or tag and the ancillary device occurs via NFC.

Preferably, a range of inventory control numbers are communicated to the remote gaming server, such as the starting and ending numbers of a sequence of numbers. Alternatively, each of the actual inventory control numbers may be communicated. Since it is contemplated that a very large number of inventory control numbers may be loaded into a NFC chip or tag, so as to allow for subsequent purchases of game plays, communicating only the range of numbers is more efficient than communicating each number. For convenience, the scope of the feature of communicating "the plurality of inventory control numbers allocated to the NFC chip or tag" includes both of these embodiments, namely, the embodiment of communicating the range of inventory control numbers, as well as communicating each of the individual inventory control numbers. Communicating a range of inventory control numbers works best when the inventory control numbers are sequential or follow a known skip pattern, since the remote gaming server can easily determine if the received range matches the inventory control numbers in the database 400. However, if the inventory control numbers were randomly selected when initially loaded into the NFC chip or tag, it would be necessary to communicate each of the inventory control numbers to the remote gaming server.

The remote gaming server then attempts to authenticate the NFC chip or tag. Authentication requires two items of data to match up. First the received NFC chip or tag identifier must match a NFC chip or tag identifier in the first database. Second, the received plurality of inventory control numbers allocated to the NFC chip or tag must match the plurality of unique inventory control numbers allocated to the received NFC chip or tag identifier in the first database. Authentication is successful when both items of data match up, and authentication fails when at least one of the items of data do not match up.

Similar to the discussion above, scope of "the received plurality of inventory control numbers allocated to the NFC chip or tag" includes the embodiment of receiving the range of inventory control numbers, or receiving each of the individual inventory control numbers.

Game Play

Game play is the process for allowing a consumer to reveal game outcomes (game play results). When authentication of the NFC chip or tag is successful, the game outcomes associated with each of the validation codes assigned to the inventory control numbers of the purchased game plays are electronically communicated from the remote gaming server to the ancillary device. If authentication fails, the electronic communication of the game outcomes is prevented from occurring. Once the consumer becomes aware that one or more purchased tickets is a winner, ticket redemption may occur. Ticket redemption may require a process similar to the above-described authentication process. Furthermore, as shown in FIG. 3C, once a ticket is redeemed, an entry is made in database 300 so that the ticket cannot be redeemed a second time, even if the NFC chip or tag is successfully authenticated.

Additional Details

1. Ancillary Device

In one preferred embodiment, the ancillary device is a mobile device and the electronic communication between the ancillary device and the remote gaming server occurs via an electronic network. In this scenario, the mobile device may be a smartphone and the game results are revealed to the consumer via interaction by the consumer with an app in the smartphone.

2. Digital Signature for Use in Authentication

As described above, cryptographic techniques may be used for the authentication. In one preferred embodiment, the NFC chip or tag identifier and the plurality of unique inventory control numbers allocated to the NFC chip or tag by the NFC chip or tag are digitally signed. The digital signature is then electronically communicated to the remote gaming server which authenticates the NFC chip or tag by verifying the digital signature of the NFC chip or tag identifier and the plurality of unique inventory control numbers allocated to the NFC chip or tag. As also described above, the digital signature may be static or dynamic.

3. Electronic Communication

The electronic communication that occurs between the ancillary device and the remote gaming server, between the electronic purchasing platform and the remote gaming server, and the electronic redemption platform (discussed below) and the remote gaming server may occur via an electronic network, such as the internet, ethernet, WAN/LAN, or the like.

4. Software Code (Software Programs)

To implement the processes described above and illustrated in FIGS. 1A and 1B, various software programs are required in the different components, namely, the NFC chip or tag, the ancillary device, the remote gaming server. Each software program is a computer program product that is embodied in the form of computer executable code contained on a non-transitory computer-readable medium (e.g., read-only memory, random-access memory, electronically-programmable memory, disk memory, flash memory), wherein the code is executed by a processor and causes the processor to implement the various operations described herein.

NFC Chip or Tag:

The software code performs at least the following functions to facilitate the processes illustrated in FIGS. 1A and 1B:

a. Allow for NFC communication with the ancillary device so that the NFC chip or tag identifier and the inventory control numbers (or the range thereof) can be communicated to the ancillary device.

b. Perform digital signature generation of the information above.

The NFC chip or tag includes additional software code that allows for the NFC chip or tag to be initially programmed with inventory control numbers, but that aspect of the NFC chip or tag is not part of the processes illustrated in FIGS. 1A and 1B, and thus is not described in further detail herein.

Ancillary Device:

The software code performs at least the following functions to facilitate the processes illustrated in FIGS. 1A and 1B:

a. Allow for NFC communication with the NFC chip or tag so that the NFC chip or tag identifier and the inventory control numbers (or the range thereof) can be communicated to the ancillary device as part of the authentication process.

b. Allow for electronic communication, such as via an electronic network, with the remote gaming server so that the NFC chip or tag identifier and the inventory control numbers (or the range thereof) can be communicated to the remote gaming server as part of the authentication process.

c. Receive back from the remote gaming server the game outcomes for the previously paid for game plays of the NFC chip, and display the game outcomes on a display of the ancillary device, as part of the game play.

Remote gaming server: The software code performs at least the following functions to facilitate the processes illustrated in FIGS. 1A and 1B:

a. Assign validation codes to inventory control numbers when game plays are purchased for respective NFC chips or tags.

b. Update database 300 when validation codes are assigned and redeemed.

c. Allow for electronic communication, such as via an electronic network, with the ancillary device so that the NFC chip or tag identifier and the inventory control numbers (or the range thereof) can be received from the ancillary device as part of the authentication process.

d. Verify the digital signature of the NFC chip or tag identifier and the plurality of unique inventory control numbers allocated to the NFC chip or tag.

e. Communicate game outcomes for the previously paid for game plays to the ancillary device.

5. Authentication During Activation (Instant Ticket Purchase Process)

As discussed above, an authentication process occurs in conjunction with game play. As also discussed above, a similar authentication process may be required during redemption to ensure that the consumer is in possession of a legitimate NFC chip or tag. A similar authentication process may also occur at the electronic purchasing platform (e.g., retailer's POS equipment) during the instant ticket purchase process, particularly if the electronic purchasing platform has an NFC reader. As discussed above, in one preferred embodiment, the electronic purchasing platform electronically communicates at least the following data to the remote gaming server:

1. The NFC chip or tag identifier or an equivalent number thereof.

2. The monetary amount of virtual instant tickets that was purchased.

An authentication process using an electronic purchasing platform with NFC reading capability would read out the NFC chip or tag identifier from the NFC chip or tag, since there would be no need to send an equivalent number thereof, such as an external bar code on the NFC chip or tag. In addition, the plurality of unique inventory control numbers (or the range thereof) would be also read out of the NFC chip or tag identifier and sent to the remote gaming server. The remote gaming server would verify that an NFC chip or tag having the received identifier and inventory control numbers exists in the database 400, and if so, the activation process can be completed.

In an alternative embodiment, the process described above may also include the digital signature (digital signing) and digital signature verification embodiment described above with respect to the authentication that occurs in conjunction with game play. That is, the electronic purchasing platform sends the digitally signed information to the remote gaming server.

6. Authentication During Redemption

As discussed above, in one preferred embodiment, NFC transfer is conducted with the retailer's POS equipment during redemption, instead of scanning a separate validation barcode 152 (FIG. 1C). That is, the same authentication process described above that occurs during activation, and when revealing game play results on an ancillary device, may also occur during redemption. In fact, it is not even necessary to reveal game play results on the ancillary device to request redemption. Of course, the consumer would be unaware of whether any purchased instant tickets are winners if redemption is requested before game play results are revealed. However, the consumer may not care about the reveal process, and may find it acceptable to simply present the NFC chip or tag to a redemption device and find out on the spot whether any purchased instant tickets are winners.

Figure 6:
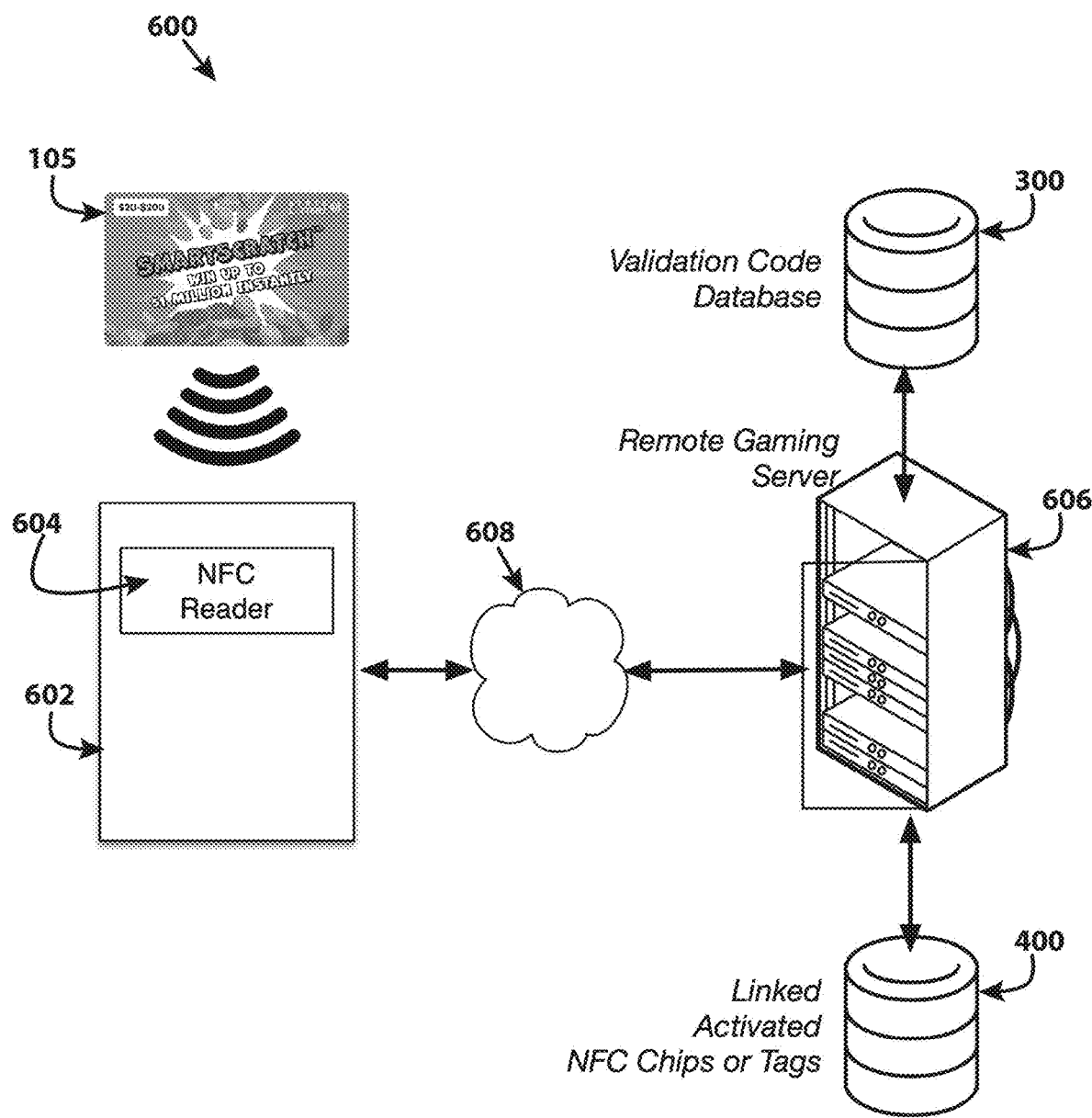
FIG. 6 shows a schematic diagram of the components associated with redemption for use in one preferred embodiment of the present invention.

FIG. 6 shows a schematic diagram of selected components of a system 600 associated with redemption, as follows:

1. Electronic redemption platform 602, including NFC reader 604 (e.g., retailer's POS equipment with added NFC reader, lottery terminal with added NFC reader). The electronic redemption platform 602 may be the same platform that is used as the electronic purchasing platform. Alternatively, the electronic redemption platform 602 may be a separate platform from the electronic purchasing platform.

2. Remote gaming server 606 (equivalent to server 108 of Central Site 103 of FIG. 1A).

3. Electronic network 608 (e.g., internet, ethernet, WAN/LAN).

The authentication process that occurs during redemption is similar to the authentication and game play process described above, except that that the electronic redemption platform 602, not the ancillary device 102, acts as the communication interface between the NFC chip or tag 105 and the remote gaming server 606. When authentication is successful, redemption, instead of revealing of game play results, occurs via the electronic redemption platform 602. Likewise, when authentication is not successful, no redemption can occur.

The redemption process also includes one additional step, which is for the remote gaming server 606 to verify in the validation database 300 that the validation code for a winning instant ticket was not previously redeemed. If the consumer subsequently purchases additional game plays on the NFC chip or tag, and has already redeemed any wins from previous purchases, the remote gaming server 606 identifies any winning instant tickets that were not previously redeemed, and redeems only those winning tickets.

7. Authentication Using Only NFC Chip or Tag Identifier

The authentication processes described above use the NFC chip or tag identifier, as well as the plurality of inventory control numbers allocated to the NFC chip or tag, or the range thereof. Authentication is strengthened by using both of these pieces of information. However, in a less secure embodiment, the authentication process may involve sending only the NFC chip or tag identifier. In an alternative, and also less secure embodiment, the authentication process may involve sending only the plurality of inventory control numbers allocated to the NFC chip or tag, or the range thereof, and then performing a reverse lookup in the database 400 to identify the correct NFC chip or tag to assign validation codes to.

As is apparent to one skilled in the art in view of the previous disclosure, the above invention is not necessarily limited to lottery applications. For example, the same system and protocols could be employed in a cruise ship environment where the assignment of validation codes occurs when a passenger states that he or she would like to play game while on the cruise. In this embodiment, the NFC chip or tag could preferably be the consumer's cabin key with the gaming capabilities loaded upon request.

It should be appreciated by those skilled in the art that various modifications and variations may be made to the present invention without departing from the scope and spirit of the invention. It is intended that the present invention include such modifications and variations as come within the scope of the appended claims.

What is claimed is:

1. A method for allowing a plurality of consumers to play virtual instant tickets using a plurality of Near Field Communication (NFC) chips or tags, each NFC chip or tag having (i) a unique NFC chip or tag identifier stored therein, and (ii) a memory that stores a plurality of unique inventory control numbers allocated to the NFC chip or tag, the plurality of unique inventory control numbers being a subset from a pool of unique inventory control numbers, each inventory control number representing one game play having a game outcome, each instant ticket having a predefined monetary amount for the one game play, the method comprising:

(a) maintaining in a remote gaming server:
  (i) a first database that includes:
    (A) the plurality of unique NFC chip or tag identifiers for the respective plurality of NFC chips or tags, and
    (B) the plurality of unique inventory control numbers allocated to each of the respective NFC chip or tags identifiers, and
  (ii) a second database that includes:
    (A) a plurality of unique validation codes, and
    (B) a game outcome associated with each of the validation codes;

(b) activating a NFC chip or tag upon purchase by the consumer of a monetary amount of virtual instant tickets to be associated with the NFC chip or tag via an electronic purchasing platform, the activating including:
  (i) electronically communicating from the electronic purchasing platform to the remote gaming server:
    (A) the NFC chip or tag identifier or an equivalent number thereof, and
    (B) the monetary amount of virtual instant tickets that were purchased,
  (ii) identifying, in the remote gaming server, the NFC chip or tag identifier in the first database using the NFC chip or tag identifier or the equivalent number thereof, and
  (iii) assigning, by the remote gaming server, currently unassigned validation codes to respective inventory control numbers of the identified NFC chip or tag, wherein the number of assigned validation codes equals the number of purchased game plays as determined by the monetary amount of purchased instant tickets and the predefined monetary amount for one game play, wherein an assigned validation code cannot be assigned to another inventory control number;

(c) authenticating a NFC chip or tag to allow for revealing the game outcome of purchased instant tickets by:

(i) electronically communicating from the NFC chip or tag to the remote gaming server via an ancillary device:
   (A) the NFC chip or tag identifier of the NFC chip or tag, and
   (B) the plurality of inventory control numbers allocated to the NFC chip or tag, wherein the electronic communication between the NFC chip or tag and the ancillary device occurs via NFC, and
(ii) authenticating, in the remote gaming server, the NFC chip or tag when:
   (A) the received NFC chip or tag identifier matches a NFC chip or tag identifier in the first database, and
   (B) the received plurality of inventory control numbers allocated to the NFC chip or tag matches the plurality of unique inventory control numbers allocated to the received NFC chip or tag identifier in the first database; and
(d) electronically communicating the game outcomes associated with each of the validation codes assigned to the inventory control numbers of the purchased game plays from the remote gaming server to the ancillary device when authentication of the NFC chip or tag is successful, and preventing electronic communication of the game outcomes when authentication of the NFC chip or tag is not successful.

2. The method of claim 1 wherein the ancillary device is a mobile device, and the electronic communication between the ancillary device and the remote gaming server occurs via an electronic network.

3. The method of claim 2 wherein the mobile device is a smartphone and the game outcomes are revealed to the consumer via interaction by the consumer with an app in the smartphone.

4. The method of claim 1 further comprising:
(e) digitally signing the NFC chip or tag identifier and the plurality of unique inventory control numbers allocated to the NFC chip or tag by the NFC chip or tag, wherein the electronic communication in step (c)(i) occurs by electronically communicating the digital signature of the NFC chip or tag identifier and the plurality of unique inventory control numbers allocated to the NFC chip or tag, and wherein the remote gaming server authenticates the NFC chip or tag in step (c)(ii) by verifying the digital signature of the NFC chip or tag identifier and the plurality of unique inventory control numbers allocated to the NFC chip or tag.

5. The method of claim 4 wherein the digital signature is dynamic.

6. The method of claim 1 wherein the remote gaming server selects the validation codes for assigning to respective inventory control numbers by pulling the validation codes in a sequential manner from a virtual stack of previously generated validation codes stored in the second database.

7. The method of claim 1 wherein the remote gaming server selects the validation codes for assigning to respective inventory control numbers by pulling the validation codes in a random or pseudorandom manner from a virtual stack of previously generated validation codes stored in the second database.

8. The method of claim 1 wherein the virtual instant tickets are associated with a lottery game, and the inventory control numbers are from the lottery game.

9. The method of claim 1 wherein the second database further includes:

(C) an indicator of whether each of the validation codes has been assigned to a respective inventory control number, and wherein the method further comprises:
(e) updating the respective indicators in the second database to record that the validation codes were assigned to inventory control numbers.

10. A method for allowing a plurality of consumers to redeem winning virtual instant tickets using a plurality of Near Field Communication (NFC) chips or tags, each NFC chip or tag having (i) a unique NFC chip or tag identifier stored therein, and (ii) a memory that stores a plurality of unique inventory control numbers allocated to the NFC chip or tag, the plurality of unique inventory control numbers being a subset from a pool of unique inventory control numbers, each inventory control number representing one game play having a game outcome, each instant ticket having a predefined monetary amount for the one game play, the method comprising:
(a) maintaining in a remote gaming server:
   (i) a first database that includes:
      (A) the plurality of unique NFC chip or tag identifiers for the respective plurality of NFC chips or tags, and
      (B) the plurality of unique inventory control numbers allocated to each of the respective NFC chip or tags identifiers, and
   (ii) a second database that includes:
      (A) a plurality of unique validation codes,
      (B) a game outcome associated with each of the validation codes, and
      (C) an indicator of whether redemption occurred regarding validation codes associated with winning virtual tickets;
(b) activating a NFC chip or tag upon purchase by the consumer of a monetary amount of virtual instant tickets to be associated with the NFC chip or tag via an electronic purchasing platform, the activating including:
   (i) electronically communicating from the electronic purchasing platform to the remote gaming server:
      (A) the NFC chip or tag identifier or an equivalent number thereof, and
      (B) the monetary amount of virtual instant tickets that were purchased,
   (ii) identifying, in the remote gaming server, the NFC chip or tag identifier in the first database using the NFC chip or tag identifier or the equivalent number thereof, and
   (iii) assigning, by the remote gaming server, currently unassigned validation codes to respective inventory control numbers of the identified NFC chip or tag, wherein the number of assigned validation codes equals the number of purchased game plays as determined by the monetary amount of purchased instant tickets and the predefined monetary amount for one game play, wherein an assigned validation code cannot be assigned to another inventory control number;
(c) authenticating a NFC chip or tag to allow for redeeming any winning game outcomes of purchased instant tickets by:
   (i) electronically communicating from the NFC chip or tag to the remote gaming server via an electronic redemption platform:
      (A) the NFC chip or tag identifier of the NFC chip or tag, and (B) the plurality of inventory control numbers allocated to the NFC chip or tag, wherein the electronic communication between the NFC chip or tag and the electronic redemption platform occurs via NFC, and (ii) authenticating, in the remote gaming server, the NFC chip or tag when:

(A) the received NFC chip or tag identifier matches a NFC chip or tag identifier in the first database, (B) the received plurality of inventory control numbers allocated to the NFC chip or tag matches the plurality of unique inventory control numbers allocated to the received NFC chip or tag identifier in the first database, and (C) the indicator of whether redemption occurred regarding validation codes associated with winning virtual tickets shows that redemption has not yet occurred for one or more validation codes that were assigned to the inventory control numbers allotted to the NFC chip or tag; and (d) electronically communicating from the remote gaming server to the electronic redemption platform that redemption may proceed for each of the validation codes assigned to the inventory control numbers of the purchased game plays when authentication of the NFC chip or tag is successful, and preventing redemption from proceeding when authentication of the NFC chip or tag is not successful, wherein redemption occurs for only unredeemed winning virtual tickets.

11. The method of claim 10 wherein the electronic communication between the electronic purchasing platform and the remote gaming server occurs via an electronic network.

12. The method of claim 10 further comprising:

(e) digitally signing the NFC chip or tag identifier and the plurality of unique inventory control numbers allocated to the NFC chip or tag by the NFC chip or tag, wherein the electronic communication in step (c)(i) occurs by electronically communicating the digital signature of the NFC chip or tag identifier and the plurality of unique inventory control numbers allocated to the NFC chip or tag, and wherein the remote gaming server authenticates the NFC chip or tag in step (c)(ii) by verifying the digital signature of the NFC chip or tag identifier and the plurality of unique inventory control numbers allocated to the NFC chip or tag.

13. The method of claim 11 wherein the digital signature is dynamic.

14. The method of claim 10 wherein the electronic communication between the electronic redemption platform and the remote gaming server occurs via an electronic network.

15. The method of claim 10 wherein the remote gaming server selects the validation codes for assigning to respective inventory control numbers by pulling the validation codes in a sequential manner from a virtual stack of previously generated validation codes stored in the second database.

16. The method of claim 10 wherein the remote gaming server selects the validation codes for assigning to respective inventory control numbers by pulling the validation codes in a random or pseudorandom manner from a virtual stack of previously generated validation codes stored in the second database.

17. The method of claim 10 wherein the virtual instant tickets are associated with a lottery game, and the inventory control numbers are from the lottery game.

18. The method of claim 10 wherein the second database further includes:

(D) an indicator of whether each of the validation codes has been assigned to a respective inventory control number, and wherein the method further comprises:

(e) updating the respective indicators in the second database to record that the validation codes were assigned to inventory control numbers.

* * * * *

UNITED STATES PATENT AND TRADEMARK OFFICE
CERTIFICATE OF CORRECTION

PATENT NO. : 10,789,808 B1
APPLICATION NO. : 16/867626
DATED : September 29, 2020
INVENTOR(S) : Lindelsee et al.

Page 1 of 1

It is certified that error appears in the above-identified patent and that said Letters Patent is hereby corrected as shown below:

In the Specification

Column 8, Line 67: after "invention" add --.--

In the Claims

Column 22, Line 66: change "a" to --the--

Column 24, Line 60: change "a" to --the--

Column 26, Line 9: change "11" to --10--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*